Figure 1:
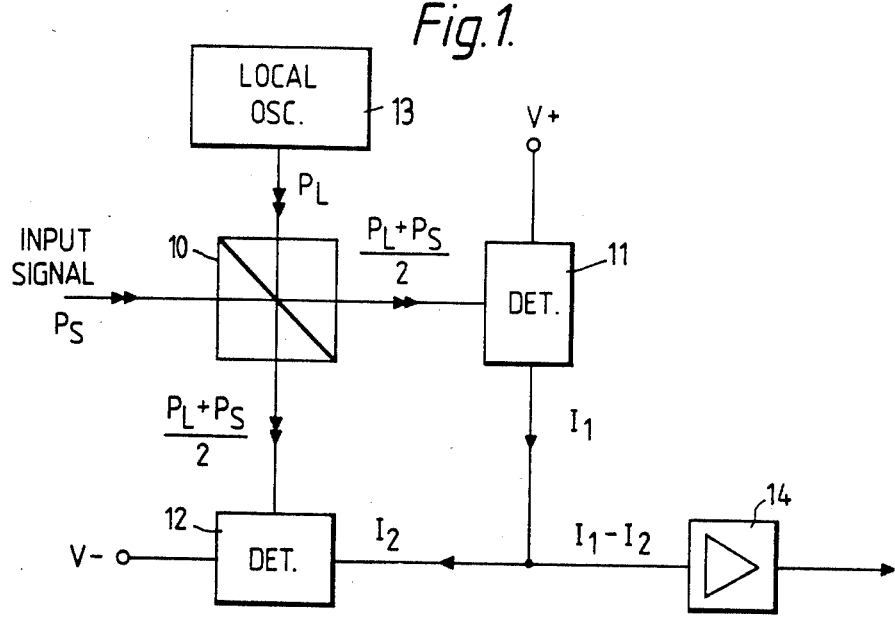

United States Patent [19]

Wright et al.

[11] Patent Number: 4,596,052
[45] Date of Patent: Jun. 17, 1986

[54] COHERENT OPTICAL RECEIVER

[75] Inventors: Stephen Wright, Finsbury Park, England; Philip R. Couch, Roanoke, Va.

[73] Assignee: International Standard Electric Corporation, New York, N.Y.

[21] Appl. No.: 496,747

[22] Filed: May 20, 1983

[30] Foreign Application Priority Data

May 20, 1982 [GB] United Kingdom ............... 8214733

[51] Int. Cl.$^4$ ............................................... H04B 9/00
[52] U.S. Cl. ............................................................. 455/619
[58] Field of Search ................ 455/617, 619; 356/345, 356/358

[56] References Cited

U.S. PATENT DOCUMENTS 3,694,656 9/1972 Henning ............................... 350/370
4,063,084 12/1977 Goodwin et al. ..................... 455/619

OTHER PUBLICATIONS

*The American Heritage Dictionary*, Second College Edition, 1982, p. 1120.

Primary Examiner—Joseph A. Orsino, Jr.
Attorney, Agent, or Firm—John T. O'Halloran

[57] ABSTRACT

A coherent optical receiver for an input optical signal including a local oscillator source of coherent optical signal a single beam splitter/combiner to which both the input and local oscillator signals are applied to produce two substantially identical combined optical signals, a pair of substantially identical photodetectors electrically connected in series, each photodetector receiving one of the combined optical signals, and an output amplifier the input of which is connected to the series connection between the photodetectors.

7 Claims, 2 Drawing Figures

COHERENT OPTICAL RECEIVER

This invention relates to a coherent optical receiver using balanced detectors.

The general principles of coherent detection of modulated signals are well established. In the field of optical communication systems, coherent receivers using laser local oscillators and balanced detectors have been described in "Laser Receivers" by Monte Ross, published by Wiley, N.Y. In that book, at pages 112-113, there is described a receiver in which an input signal plus a local oscillator reference signal is fed to one of a pair of basically identical detectors, whilst the input signal minus the local oscillator reference signal is fed to the other detector of the pair. The arrangement requires, in addition to a beam splitter, two half silvered mirrors, a 180° phase changer for the local oscillator signal, and a subtraction circuit for the two detector outputs. The subtracted outputs from the two detectors form the output signal.

According to the present invention there is provided a coherent optical receiver for an input optical signal $P_s$ including a local oscillator source of coherent optical power $P_L$ at a frequency substantially that of the input signal mixing means to which both the input and local oscillator signals are applied to produce two substantially identical coherently combined signals, a pair of substantially identical photodetectors, each photodetector receiving one of the combined signals, and means for amplifying the two photodetector outputs differentially.

Figure 2:
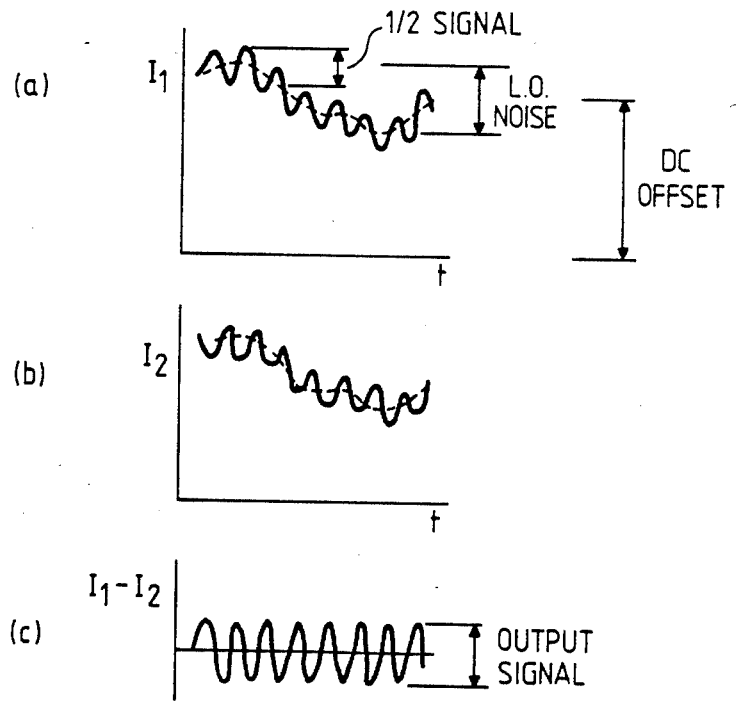

An embodiment of the invention will now be described with reference to the accompanying drawings, in which:

FIG. 1 illustrates schematically a coherent optical receiver using a pair of balanced detectors, and FIG. 2 illustrates waveforms associated with the receiver of FIG. 1.

In the arrangement shown in FIG. 1 an input optical signal $P_s$ is directed to a half silvered mirror beam splitter/combiner 10. Half of the input signal $P_2$ is directed to a first detector 11, e.g. an avalanche photodiode, whilst the other half of the input signal $P_s$ is directed to a second identical photodetector 12. Similarly a coherent signal $P_L$, generated by a local oscillator laser 13 which may be a semiconductor laser, is also directed to the beam splitter/combiner 10 such that half the reference signal is directed to each photodetector. The local oscillator and input signals coherently combine and interfere. Each photodetector therefore receives a combined signal which varies in intensity at the difference between local oscillator and input frequencies. The two avalanche diodes 11, 12 are electrically connected in series between bias terminals V+ and V—. An output amplifier 14 has its input connected to the mid point X of the series connection between diodes 11 & 12.

As shown in FIG. 2(a) the detector current $I$ from diode 11 contains a large d.c. level offset due to the average local oscillator power, a noise component due to local oscillator power fluctuations, and a difference frequency component which will contain the input signal modulation. The same d.c. offset and noise components are present in the complementary current $I_2$ from diode 12, but the modulation component is in antiphase with that of $I$ as shown in FIG. 2(b). Summing the two currents differentially at point X causes cancellation of the undesirable noise components due to local oscillator power fluctuations and restores all of the wanted signal components, as shown in FIG. 2(c). There is thus no significant signal or local oscillator power loss through the splitter/combiner and the optimum splitting fraction is always 50%. With the series photo detector connection, low noise photo detector biassing is simplified and large photocurrents due to local oscillator operation are always cancelled. Because of the efficient use of local oscillator and signal power a lower power local oscillator may be used. The scheme is amenable to integrated or fibre optic implementation. In the latter case, as an alternative to the use of a half-silvered mirror beam splitter/combiner, a directional optical fibre coupler may be used.

Also, instead of having a single amplifier connected to point X, the diode outputs may be separately amplified and then combined differentially.

We claim:

1. A coherent optical receiver for optical input signal at a basic frequency having modulation imposed thereon as frequency modulation, comprising a local oscillator source of a coherent optical local oscillator signal at a frequency substantially corresponding to the basic frequency of the input signal; mixing means to which both the input and local oscillator signals are applied to produce two coherently combined optical signals which both vary in intensity in dependence on the frequency modulation but differ from each other in phase in such a manner that those components of the combined optical signals which vary with the local oscillator signal power are in-phase while those components which vary with the frequency modulation are in antiphase with one another; a pair of substantially identical photodetectors each having an input connected to a different one of two points of different electrical potentials and an output, each photodetector receiving one of the combined optical signals and generating in response thereto an electrical output signal containing electrical equivalents of said components of the respective combined optical signal, said electrical output signal appearing at said output of the respective photodetector; and means for providing a resultant output signal representative of the difference between said electrical output signals appearing at said outputs of said photodetectors with attendant elimination of the in-phase components from and addition of the antiphase components of the electrical output signals in said resultant output signal.

2. A receiver according to claim 1 wherein the local oscillator source is a semiconductor laser.

3. A receiver according to claim 1 wherein the photodetectors are avalanche photodiodes.

4. A receiver according to claim 1 wherein the mixing means is a half-silvered beam splitter/combiner.

5. A receiver according to claim 1 wherein the mixing means is a fibre-optic directional coupling.

6. A receiver as defined in claim 1, further comprising a connecting line directly connecting said photodetectors in series with one another; and wherein said detecting means includes a tap line connected to said connecting line.

7. A receiver according to claim 6, wherein said detecting means includes amplifying means interposed in said tap line.

* * * * *